Jan. 15, 1924. 1,480,888
C. H. MARSHALL
APPARATUS FOR PRODUCING INTERACTION BETWEEN GASES AND LIQUIDS
Filed Nov. 21, 1919 4 Sheets-Sheet 1

Inventor
Charles H. Marshall
By Munday, Clarke & Carpenter, his Attys

Jan. 15, 1924. 1,480,888
C. H. MARSHALL
APPARATUS FOR PRODUCING INTERACTION BETWEEN GASES AND LIQUIDS
Filed Nov. 21, 1919 4 Sheets-Sheet 2

Inventor
Charles H. Marshall

Jan. 15, 1924.

C. H. MARSHALL 1,480,888

APPARATUS FOR PRODUCING INTERACTION BETWEEN GASES AND LIQUIDS

Filed Nov. 21, 1919   4 Sheets-Sheet 3

Inventor
Charles H. Marshall

By Munday, Clarke & Carpenter
his Attys

Jan. 15, 1924. 1,480,888
C. H. MARSHALL
APPARATUS FOR PRODUCING INTERACTION BETWEEN GASES AND LIQUIDS
Filed Nov. 21, 1919 4 Sheets-Sheet 4
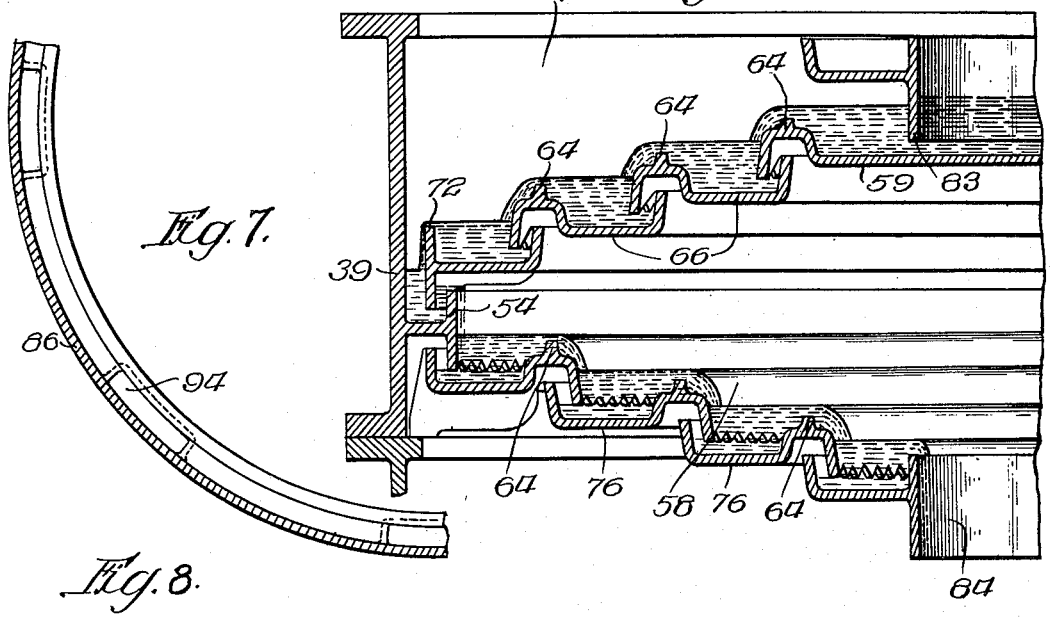
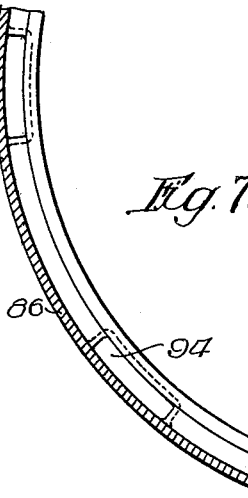
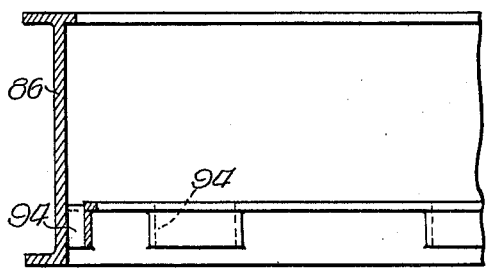
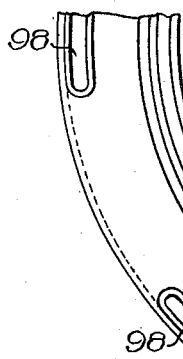
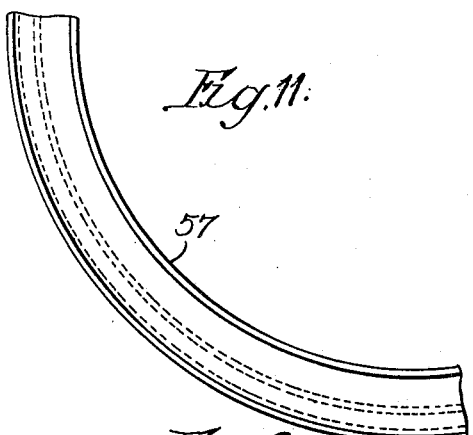
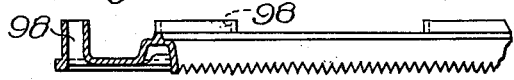
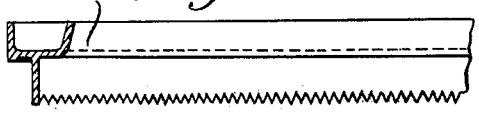

Patented Jan. 15, 1924.

1,480,888

UNITED STATES PATENT OFFICE.

CHARLES H. MARSHALL, OF CRAFTON, PENNSYLVANIA, ASSIGNOR TO THE KOPPERS COMPANY, OF PITTSBURGH, PENNSYLVANIA, A CORPORATION OF PENNSYLVANIA.

APPARATUS FOR PRODUCING INTERACTION BETWEEN GASES AND LIQUIDS.

Application filed November 21, 1919. Serial No. 339,673.

*To all whom it may concern:*

Be it known that I, CHARLES H. MARSHALL, a citizen of the United States, residing in Crafton, in the county of Allegheny and State of Pennsylvania, have invented a new and useful Improvement in Apparatus for Producing Interaction Between Gases and Liquids, of which the following is a specification.

This invention relates generically to apparatus for producing interaction between gases and liquids and has for one of its objects the provision of a construction which will cause the liquid to flow through the apparatus in cascades, i. e., through progressively lower levels, the adjacent levels of the flowing liquid lapping each other with a consequent increase in the capacity of the apparatus for liquid flow and an increased surface of liquid that is exposed to the interacting gas; and a construction which directs currents of the interacting gas through the liquid at the zones where the liquid falls from one level to another, with the result that the falling liquid meets the rising gas and then falls directly into a bubbling area produced by the rising gas, so that the gas exerts its maximum influence on the liquid. The increased capacity of the apparatus resulting from the above-mentioned over-lapping feature permits flowing the liquid in a thin film or current with a proportionate increase in the magnitude of the effect produced on the liquid by the interacting gas.

The invention also includes among its objects an increasing of the efficiency of operation of an apparatus of this character combined with a simplification in design and a reduction in the number of joints and parts, and such other improvements or advantages in construction and operation as are found to obtain in the structures and devices hereinafter described or claimed.

In the accompanying drawings, forming a part of this specification, is shown, for purposes of exemplification, a preferred form and manner in which the invention may be embodied and practiced, but without limiting the claimed invention specifically to such illustrative instance or instances:

Figure 6 is a fragmentary vertical sectional elevation of the main leg of the ammonia still showing the flow of the liquid.

Figure 7 is a fragmentary plan view of a trough positioned adjacent to the wall of the fixed leg of said still.

Figure 8 is a vertical sectional elevation through the wall and trough of the fixed leg of the still.

Figure 9 is a fragmentary plan view of the tray adjacent to and beneath the trough illustrated in Figures 7 and 8.

Figure 10 is a fragmentary vertical sectional elevation of the tray illustrated in Figure 9.

Figure 11 is a fragmentary plan view of the tray adjacent to and above the trough illustrated in Figures 7 and 8.

Figure 12 is a fragmentary vertical sectional elevation of the tray illustrated in Figure 11.

The same characters of reference in the several figures indicate the same parts.

Figure 1:
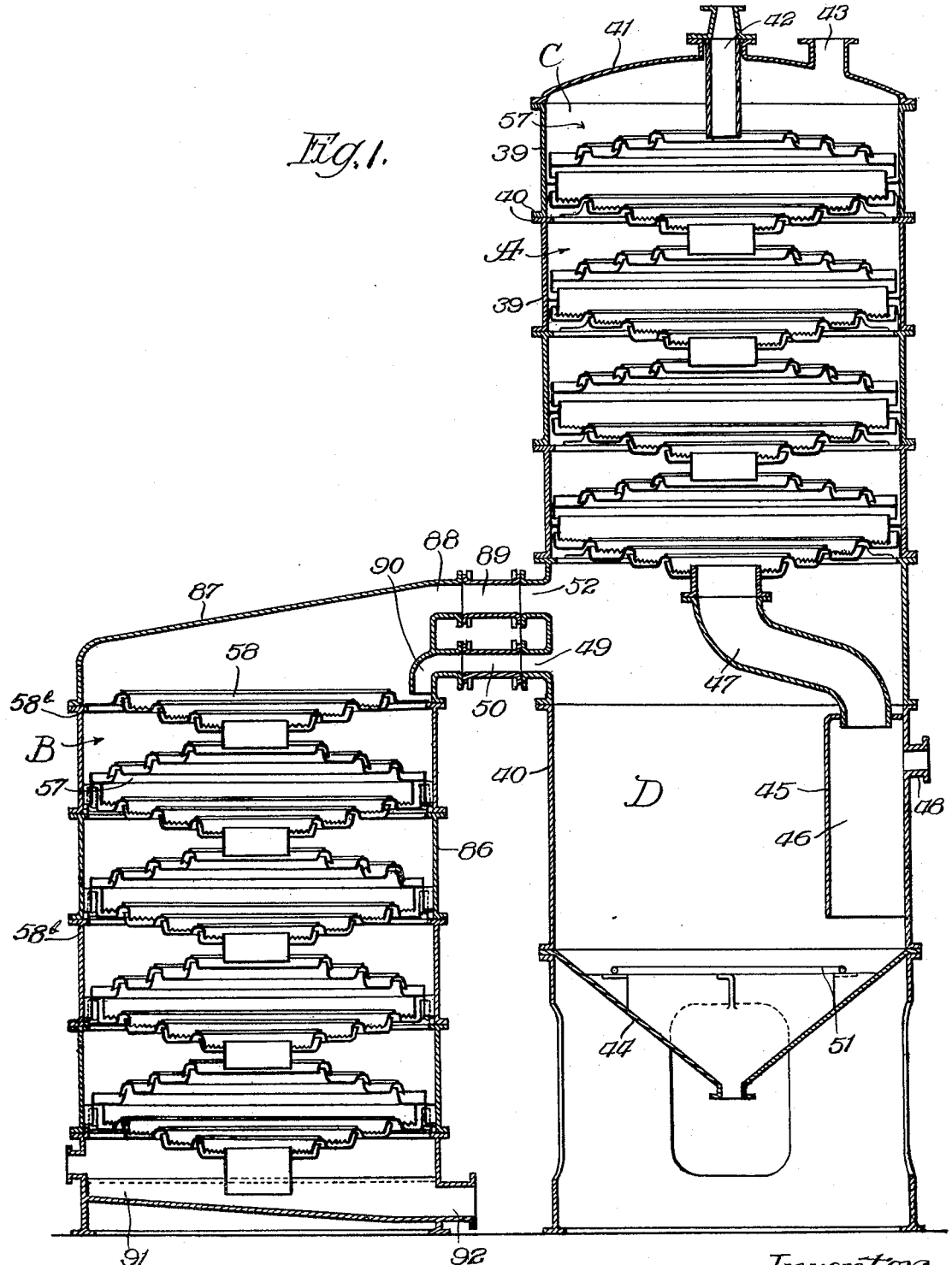
Figure 1 is a vertical sectional elevation of the type of still constructed in accordance with the invention and especially adapted for the distillation of ammonia from the ammonia liquor obtained in a plant for the recovery of by-products from the distillation of coal.

In its present embodiment, the invention is incorporated in a still and for convenience the present description will be confined to this use of the invention; features of construction of the invention are, however, readily susceptible of other valuable applications and, consequently, it is manifest that the scope of the invention is by no means confined to the specific use and specific embodiment herein described as an illustrative example. It may be noted that the invention is capable of useful application throughout the art of producing interaction between gases and liquids, for example, the invention may be incorporated in dephlegmators, direct contact fluid coolers, and absorbers or scrubbers for gaseous fluids with results equally valuable to those attained when the invention is incorporated in a still.

Referring to the drawings the invention is embodied in a still which is intended for the distillation of ammonia liquor, obtained in plants for the recovery of by-products from the distillation of coal, in order to effect disassociation of the ammonia vapor from the ammonia liquor. As usually obtained in by-product recovery plants, ammonia liquor contains two classes of ammonia compound, i. e., free ammonia compounds and fixed ammonia compounds. The free ammonia compounds, for example ammonium carbonate and ammonium sulphide are decomposed below the boiling point of the liquor; fixed ammonia compounds, for example ammonium chloride and ammonium sulphate which are much more stable, are decomposed only by the addition of a stronger alkali, as milk of lime. Accordingly, the ammonia still consists of two parts or legs, namely, a main or free leg A in which the disassociation of ammonia from the free ammonia compounds of the liquor is effected, and a fixed leg B, in which the disassociation of the ammonia from the fixed ammonia compounds of the liquor is effected.

The main or free leg of the still is provided with a substantially cylindrical casing constructed of a plurality of cylindrical sections 39 mounted one upon the other and having annular flanges 40 at the joints between the sections; and the casing may for convenience be divided into an upper distilling chamber C and a lower shell D. The upper distilling chamber C is surmounted by a head 41 provided with an inlet 42 for discharging the ammonia liquor on to the top level of the run-way within the distilling chamber, and also with a vapor-outlet 43 through which the vapors of distillation commingled with the steam are discharged from the still for subsequent treatment. The lower shell D encloses an essentially free chamber having a conical bottom 44 adapted to be connected with a suitable normally-closed drain and is also provided with an interior partition 45 which with the wall forms an auxiliary chamber 46, the bottom of which discharges into the main chamber and the top of which is connected with the bottom level of the runway in the distilling chamber A by means of a spout 47. Communicating through the shell wall with the auxiliary chamber 46 is an inlet 48 through which milk of lime or other suitable alkali is introduced. The milk of lime mingles with the ammonia liquor containing the fixed ammonia which discharges through the spout 47, and the commingled ammonia liquor and lime discharges from the auxiliary chamber 46 into the main chamber of the lower shell. The rising mixture of ammonia liquor and milk of lime overflows through an outlet 49 in the upper end of the shell D and thence through a pipe union 50 into the fixed leg B of the still where the fixed ammonia compounds are disassociated from the mixture of ammonia liquor and milk of lime. For keeping hot the mixture of ammonia liquor and milk of lime, there is provided in the shell D a circular steam pipe 51 supplied with steam from any suitable source and perforated to discharge currents of steam into the mixture. The steam from the pipe 51 bubbles through the mixture and mingles at the top of the shell D with the steam coming from the fixed leg B of the still through the steam in-flow nozzle 52.

Figure 2:
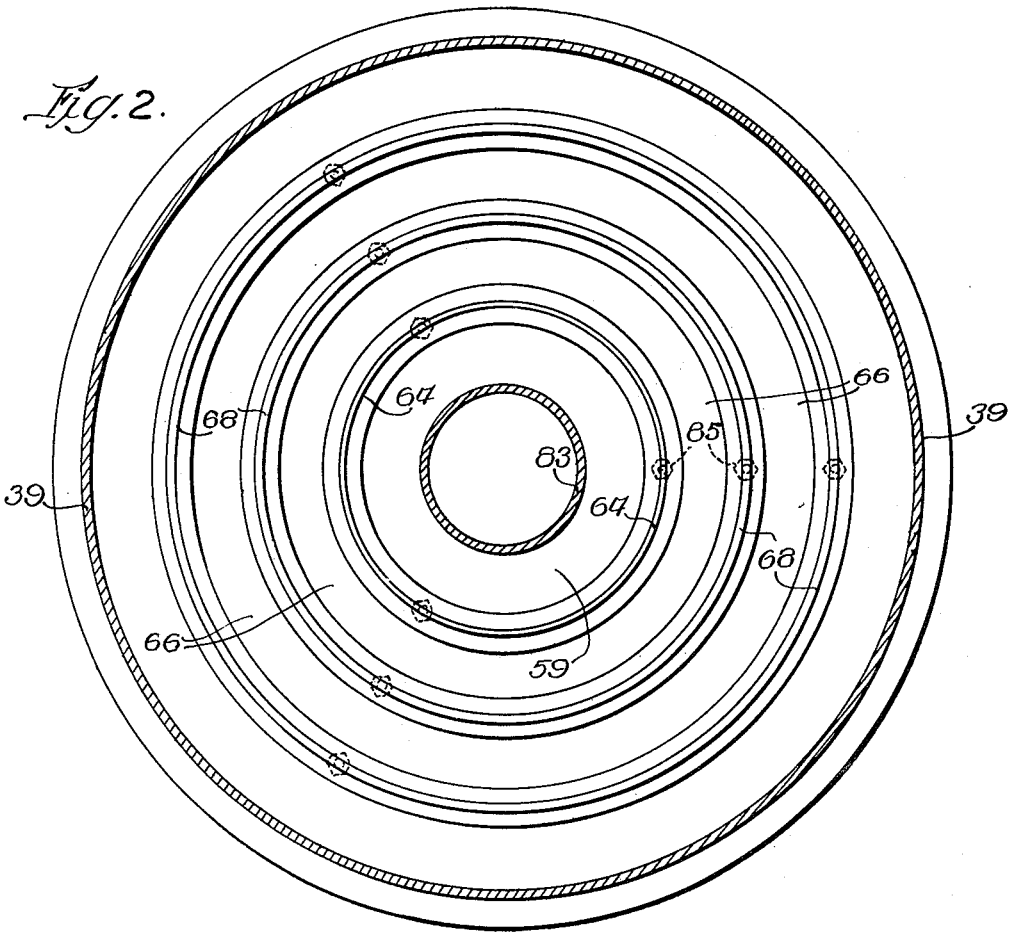
Figure 2 is a horizontal section through the main leg of the still illustrated in Figure 1, the view being in a plane indicated by the line 4—4 of Figure 3.
Figure 3:
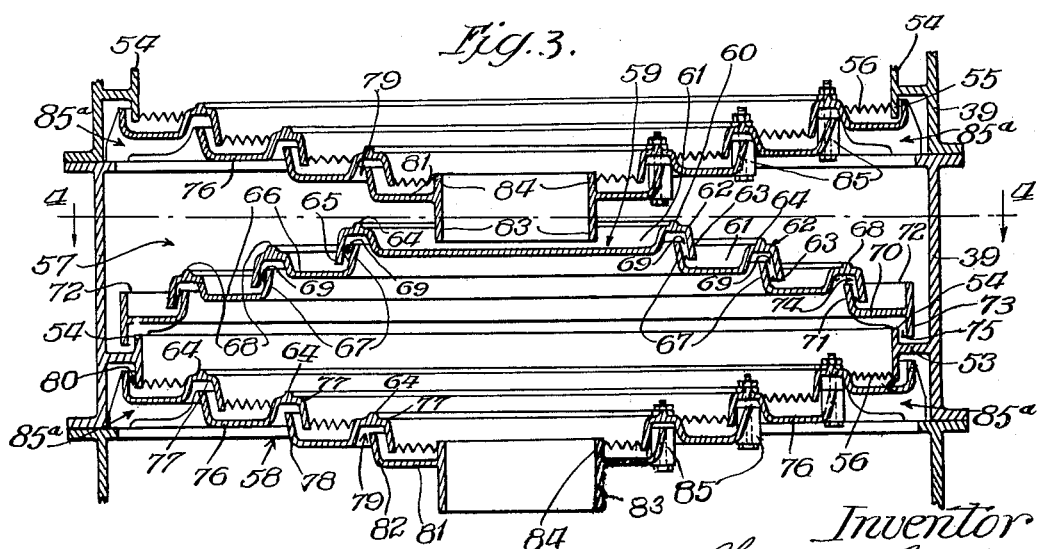
Figure 3 is an enlarged fragmentary vertical sectional elevation of the main leg of the ammonia still.
Figure 4:
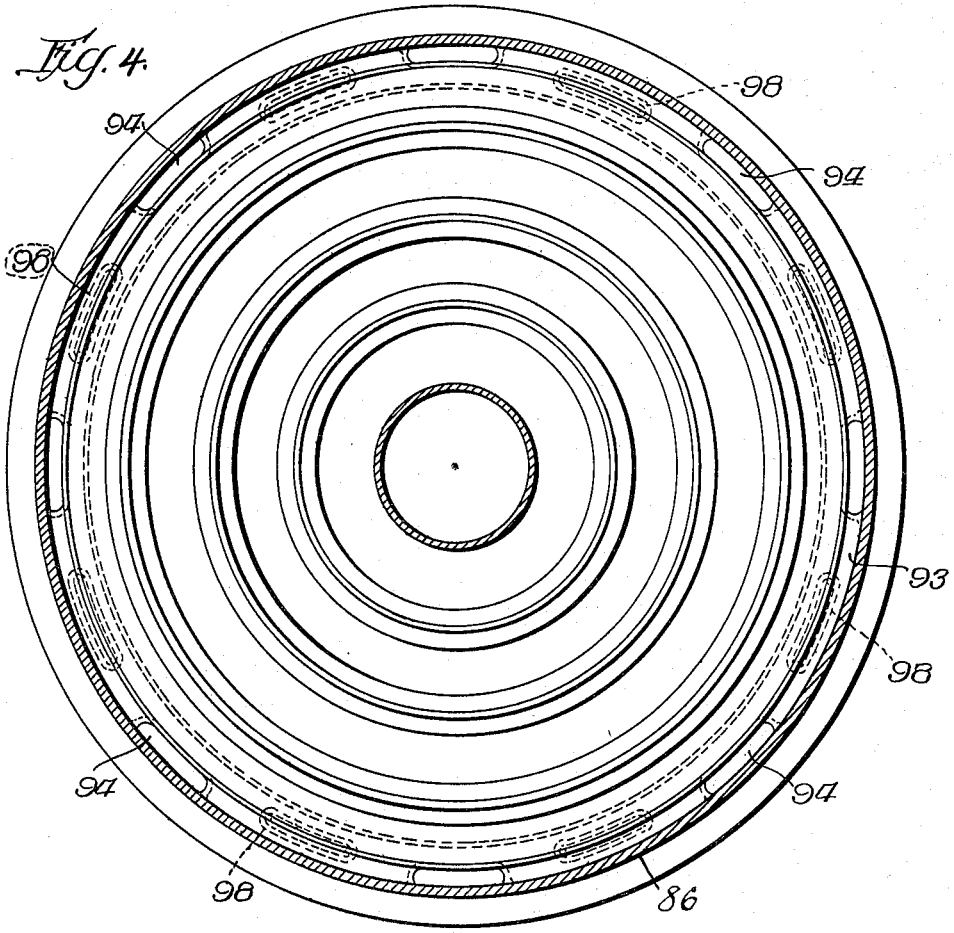
Figure 4 is a horizontal section taken through the fixed leg of the ammonia still and in a plane indicated by the line 6—6 of Figure 5.
Figure 5:
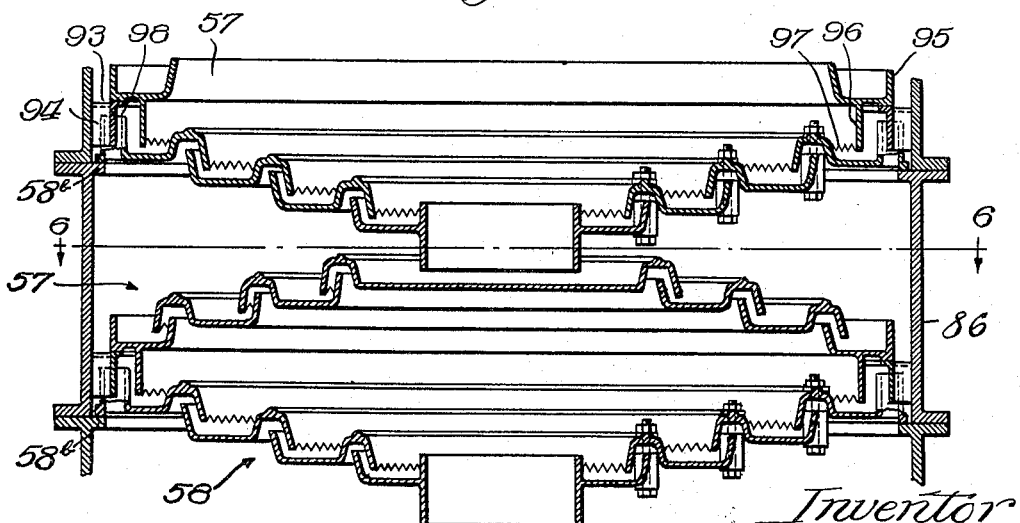
Figure 5 is an enlarged fragmentary vertical sectional elevation of the fixed leg of the ammonia still.

The invention is particularly concerned with the distilling chamber A of the main or free leg of the still and the distilling chamber of the fixed leg B of the still. The details of construction of the stepped liquid runway of the free leg of the still are illustrated more particularly in Figures 2 and 3 as shown. The cylindrical casing sections 39 are provided with interior annular troughs 53 extending from their inner wall faces; these troughs are each provided with co-extending vertical damming flanges 54 and with co-extending depending flanges 55, having notched bottom edges 56.

The troughs 53 constitute levels across which a liquid flows and co-operating with said troughs are stepped series of circular trays or channel members for discharging the liquid into the troughs and for receiving the liquid discharged from the troughs and carrying said liquid to the next trough. Discharging liquid into each trough is a stepped series 57 of circular trays of progressively increasing circumferential dimensions and receiving the liquid discharged from each trough is another stepped series 58 of circular trays, of progressively decreasing circumferential dimensions. The trays of the series 57 are all mounted above the troughs 53 with which they respectively co-operate and the trays of the series 58 are mounted below the troughs 53 with which they co-operate. With the exception of the lowermost series of trays 58 in the distilling chamber A, the several series 58 discharge into the top trays of the series 57 located respectively beneath them. The top tray 59 of each series 57 is a substantially disc-like member having an annular weir flange 60 formed by an upwardly bent portion 61 located at the edge of the main level of the tray 59 and connected by a horizontal annular portion 62 with an overhanging downwardly bent portion 63. The top of the horizontal portion 62 is formed with an annular vertical projecting rib 64 and the bottom of the edge of the overhanging portion 63 of the weir flange is notched or serrated, as shown at 65. The next succeeding trays of each series 57 down to the tray which discharges the liquid on to the trough 53 are formed of rings 66 respectively of progressively increased circumferential dimensions in the direction of liquid flow and having back flanges 67 and weir flanges 68 at their discharge edges, the latter constructed similar to the weir flanges of the top trays 59 and having their parts designated by the same reference numbers. The back flanges 67 project upwardly behind the weir flanges of adjacent trays, the lapping weir and back flanges of adjacent trays being spaced apart to provide gas-flow passages 69 which permit the up-flowing steam to pass through the liquid down-flowing from the weir flanges of the trays. The bottom trays 70 of the series 57, i. e., the trays which discharge into the troughs 53, are formed of rings of increased circumferential dimensions with respect to the trays next above them and are provided with back flanges 71 projecting upwardly behind and spaced from the overhanging weir flanges 68 of the aforesaid next above trays, and are also provided with damming flanges 72 at their discharge edges and with depending flanges 73 overhanging the damming flanges 54 of the troughs 53 and spaced therefrom. With this construction in-flow gas passages 74, are provided between the back flanges 71 of the bottom trays and the weir flanges 68 of the trays next above, and over-flow liquid pasages 75 are provided between the depending flanges 73 of the bottom trays and the damming flanges 54 of the troughs. Each series 58 of vertical trays comprises a plurality of trays constructed similarly to the trays 66 of the aforesaid series 57, with the exception of the bottom tray of each series 58. The trays 76 of each series 58 are of progressively decreasing circumferential dimensions in the direction of liquid flow and are provided with weir flanges 77, similar to the weir flanges hereinbefore described, which overhang back flanges 78 of adjacent trays and are spaced therefrom to provide gas in-flow passages 79 therebetween. The back flange 78 of the top tray of each series 58 projects upwardly behind the depending flange 55 of the trough which discharges into that tray and is spaced therefrom to provide a gas in-flow passage 80. The bottom trays 81 of the series 58 are formed with back flanges 82 projecting upwardly behind the weir flanges of the trays next above and also with central discharge spouts 83 having damming flanges 84. The discharge spouts of the series 58 respectively lead to the top trays 59 of the series 57, the discharge spout 83 of the bottom series 58 being, however, connected with the spout 47 as shown in Figure 1. The several trays of each series of trays 57 and 58 are preferably supported one from the other by means of suitable nut and bolt devices 85. The top trays of such series 58 are provided with feet 85ᵃ which rest on annular flanges inwardly projecting from the wall of the casing.

Liquid introduced through the inlet 42 into the top of the chamber A passes first on to the top series 57 of trays and cascades down said series to the aforesaid trough 53, and then flowing over the damming flange 54 of the trough discharges into the top tray of the series 58 and cascading down the series of trays 58 discharges into the next series of trays 57. The liquid flows in like manner throughout the several series of trays 57 and 58 and finally discharges through the spout 47. As the liquid flows downwardly from level to level through the chamber A, it meets rising currents of steam at the zones where it discharges from one level to another and then falls into a bubbling area of steam. This results in a concentration of the action of the steam upon the liquid so that it readily gives up its ammonia from the free ammonia compound. In order to maintain the level of the liquid constant in all the trays of each series 57 and 58, the heights of the ribs 64 of the weir flanges of the trays of each series are gauged proportionately with respect to their circumferential dimensions. For example in the case of the series 57, as shown in Figure 6, the heights of the ribs 64 increase progressively from the top tray of smallest circumferential dimension to the bottom tray of greatest circumferential dimension; conversely in the series 58, the heights of the rib 64 decrease from the top tray of greatest circumferential dimension to the bottom tray of smallest circumferential dimension. As the liquid flows from tray to tray of progressively increasing size and then from tray to tray of progressively decreasing size its flow is accelerated in the smaller trays and slows up in the larger trays. The difference in the dam heights maintains the level in each tray constant, for example the dams are higher in the larger trays which require a greater quantity of liquid before they can overflow than the smaller trays and these dams are proportioned to the relatively slower rising of the liquid level in the larger trays to maintain a liquid level in them which is approximately equal to the liquid level in the smaller trays.

From the lower shell D the mixture of ammonia liquor containing the fixed ammonia compounds and milk of lime flows through the outlet 49 and pipe union 50 into the fixed leg B of the still. The fixed leg B of the still includes a substantially cylindrical casing constructed of a plurality of cylindrical sections 86 mounted one upon the other, and the top of said casing is surmounted by a head 87 having a steam outlet 88 connected by a pipe union 89 with a steam inlet 52 leading to the main leg of the still. The head 87 is also provided with a liquid in-flow spout 90 connected to the discharge end of the pipe union 50. The mixture of ammonia liquor and milk of lime discharges from the spout 90 on to a top series of trays 58 of progressively decreasing circumferential dimensions, and flowing down said series 58 flows on to another series of trays 57 of progressively increasing circumferential dimensions and so on through alternate series of trays 57 and 58 until it discharges into the base 91 of the fixed leg from which it passes through a discharge nozzle 92 to the drain. The series 57 and 58 of trays within the fixed leg of the still function in exactly the same manner as the corresponding series of trays in the main or free leg of the still. A departure, however, is made in the construction of the troughs extending around the inner face of the wall of the fixed leg of the still and in the construction of the trays above and below said trays. Referring more particularly to Figures 4, 5 and 7 to 12 inclusive each section 86 of the casing wall is provided with an inwardly projecting annular trough 93 having a plurality of depending discharge nozzles 94 spaced from each other. The bottom tray of the series 57 adjacent to the trough 93 is provided with an annular vertical damming flange 95 and with an annular depending flange 96 having a notched bottom edge 97. The top tray of the series 58 beneath the trough 93 is provided with a plurality of upstanding steam in-flow nozzles 98 disposed in alternation with respect to the discharge nozzles of the trough. The depending flange 96 overhangs and is spaced from the discharge nozzles 94 of the trough and the upstanding steam inflow nozzles 98 of the top tray of the series 58; furthermore, the discharge nozzles 94 extend below the liquid level within the top trough of the series 58 and the in-flow nozzles 98 extend above said liquid level. With this construction both the liquid and the steam are compelled to flow under the serrated or notched edge 97 of the depending flange 96, thereby producing an agitation of the steam with the liquid and preventing the settling of lime in the trays of largest circumferential dimensions, where the velocity of the liquor is normally slow. The pressure of the steam beneath the bell formed by the depending flange 96 and the bottom tray of the series 57 acts on the liquid in the top tray of the series 58 and passing out under the notched edge 97 agitates and increases the velocity of the flow of the liquid so as to prevent settling out of the lime. The top trays of each series 58 in the fixed leg B of the still are supported directly upon annular flange 58$^b$ inwardly-projecting from the casing wall; whereas the bottom trays of the series 57 are supported upon the troughs 93. It will be noted in Figure 1, that the top tray of the top series 58 in the fixed leg B is not provided with the gas-inflow nozzles 98; these nozzles are not desirable at this level, since the liquid cascades from the topmost tray directly into the bubbling area of trays beneath.

The invention as hereinabove set forth is embodied in a particular form of construction, but may be variously embodied within the scope of the claims hereinafter made.

I claim:
1. In an apparatus of the character described, in combination: a casing; and a series of continuous channel members for directing liquid flow, said channel members being of progressively varied dimensions peripherally and mounted within said casing in overlapping spaced relation with respect to each other and at progressively lower levels, whereby liquid introduced through the top of the casing onto said channel will discharge from one channel to the next lower channel, thereby flowing through progressively lower levels to the bottom of the said casing; substantially as specified.

2. In an apparatus of the character described: a casing adapted to be supplied with an up-flowing gas at the bottom, combined with a circular stepped liquid run-way within said casing, provided with openings to permit the up-flowing gas to pass through the liquid, the steps of said run-way being of progressively varied dimensions circumferentially and provided with dams to regulate the flow of the liquid, and means for maintaining the liquid level constant in the several steps of the run-way; substantially as specified.

3. In an apparatus of the character described: a casing adapted to be supplied with an up-flowing gas at the bottom, combined with a circular stepped liquid run-way within said casing, provided with openings to permit the up-flowing gas to pass through the liquid, the steps of said run-way being of progressively varied dimensions circumferentially and provided with dams to regulate the flow of the liquid, the relative heights of the dams of the several steps of the run-way being varied proportionately with respect to the circumferential dimension of said steps, whereby a substantially constant liquid level is maintained in the several steps of the run-way; substantially as specified.

4. In an apparatus of the character described: a casing adapted to be supplied with an up-flowing gas at the bottom, combined with a circular stepped liquid run-way within said casing, provided with openings to permit the up-flowing gas to pass through the liquid, the steps of said run-way being of progressively increased dimensions circumferentially and respectively provided with dams to regulate the flow of the liquid, the relative heights of the dams of the several steps of the run-way being increased proportionately with respect to the circumferential dimensions of said steps, whereby a substantially constant liquid level is maintained in the several steps of the run-way; substantially as specified.

5. In an apparatus of the character described, in combination: a casing; and a series of circular trays provided with dams and mounted within said casing for directing liquid flow therein; said trays being in stepped relation with respect to each other and of progressively varied dimensions circumferentially, the relative heights of the dams of the several trays being varied proportionately with respect to the circumferential dimensions of the latter, whereby a substantially constant liquid level is maintained in the several trays; substantially as specified.

6. In an apparatus of the character described, in combination: a casing; a series of circular trays provided with dams and mounted within said casing for directing liquid flow therein, said trays being in stepped relation with respect to each other of progressively increased relative circumferential dimensions; and another stepped series of similar trays communicating with the lowermost tray of said first-mentioned series but of progressively decreased circumferential dimensions, the heights of the dams of all the trays of both series being varied proportionately with respect to the circumferential dimensions of the trays, whereby a substantially constant liquid level is maintained in all the trays of both series; substantially as specified.

7. In an apparatus of the character described, in combination: a cylindrical casing adapted to be supplied with an up-flowing gas at the bottom; an interior trough extending circumferentially of and disposed adjacent to the wall of said casing, said trough having depending discharge nozzles; a stepped series of trays, for liquid flow, of progressively increasing circumferential dimensions, mounted within said casing above and extending to the trough, and including a bottom tray disposed adjacent to and discharging liquid into said trough; another stepped series of trays, for liquid flow, of progressively decreasing circumferential dimensions, mounted within said casing below and extending from the trough, and including a top tray disposed adjacent to and receiving the liquid discharged from the trough; the bottom tray of the first-mentioned series having a circumferential depending flange provided with a notched bottom edge and extending within and below the liquid level of the top tray of the second-mentioned series; and the top tray of the second-mentioned series having upstanding gas in-flow nozzles disposed in alternation with the discharge nozzles of the trough; substantially as specified.

8. In an apparatus of the character described, in combination: a cylindrical casing adapted to be supplied with an up-flowing gas at the bottom; an interior trough extending circumferentially of and disposed adjacent to the wall of said casing, said trough having depending discharge nozzles; a stepped series of continuous channel members, for liquid flow, mounted within said casing above and extending to the trough, and including a bottom channel member disposed adjacent to and discharging liquid into said trough; another stepped series of continuous channel members, for liquid flow, mounted within said casing below and extending from the trough, and including a top channel member disposed adjacent to and receiving the liquid discharged from the trough; the bottom channel member of the first-mentioned series having a circumferential depending flange extending within and below the liquid level of the top channel member of the second-mentioned series; and the top channel member of the second-mentioned series having upstanding gas in-flow nozzles disposed in alternation with the discharge nozzles of the trough; substantially as specified.

In testimony whereof I have hereunto set my hand this 4th day of November, 1919.

CHARLES H. MARSHALL.